(12) United States Patent
Marks et al.

(10) Patent No.: US 12,179,628 B2
(45) Date of Patent: Dec. 31, 2024

(54) BATTERY CONSUMPTION SIMULATION OF A MACHINE BASED ON FUEL BURN DATA OF THE MACHINE

(71) Applicant: Caterpillar Inc., Peoria, IL (US)

(72) Inventors: Scott Allen Marks, Plainfield, IL (US); Royce E. Leaders, Oswego, IL (US); Frank Stadelmann, Trelex (CH)

(73) Assignee: Caterpillar Inc., Peoria, IL (US)

( * ) Notice: Subject to any disclaimer, the term of this patent is extended or adjusted under 35 U.S.C. 154(b) by 295 days.

(21) Appl. No.: 17/804,029

(22) Filed: May 25, 2022

(65) Prior Publication Data

US 2023/0382265 A1    Nov. 30, 2023

(51) Int. Cl.
*B60L 58/12*    (2019.01)
*B60W 10/06*    (2006.01)
*B60W 10/26*    (2006.01)

(52) U.S. Cl.
CPC ............. *B60L 58/12* (2019.02); *B60W 10/06* (2013.01); *B60W 10/26* (2013.01); *B60L 2200/40* (2013.01); *B60L 2240/44* (2013.01); *B60W 2710/0644* (2013.01)

(58) Field of Classification Search
CPC .......... B60W 10/06; B60L 58/12; B60L 50/62
USPC .......................................................... 701/22
See application file for complete search history.

(56) References Cited

U.S. PATENT DOCUMENTS

| | | | |
|---|---|---|---|
| 8,565,948 B2 | 10/2013 | Pudar | |
| 8,920,173 B1 | 12/2014 | Fitzgerald et al. | |
| 9,401,056 B2 | 7/2016 | Lee | |
| 2014/0129080 A1 | 5/2014 | Leibowitz et al. | |
| 2019/0001805 A1* | 1/2019 | Colavincenzo | ....... B60W 20/15 |
| 2019/0114929 A1* | 4/2019 | Sasaki | .................. G08G 5/0069 |
| 2019/0308510 A1* | 10/2019 | Beaurepaire | ........... B60K 35/60 |
| 2021/0005027 A1* | 1/2021 | Handiaz | ................. G06N 20/00 |
| 2023/0088624 A1* | 3/2023 | Salter | ...................... B60L 58/13 |
| | | | 701/117 |
| 2023/0173947 A1* | 6/2023 | Seenumani | ......... B61L 15/0058 |
| 2023/0371100 A1* | 11/2023 | Kobel | ..................... H04W 4/44 |

* cited by examiner

*Primary Examiner* — Todd Melton
*Assistant Examiner* — Vincent Feng (57) ABSTRACT

A controller may determine a battery consumption configuration of the machine based on information regarding the machine, and obtain fuel burn data indicating an amount of fuel burned by the machine. The controller may determine a simulated battery consumption of the machine based on the battery consumption configuration and the fuel burn data. The controller may determine a simulated battery charge level based on the simulated battery consumption. The controller may determine whether the simulated battery charge level satisfies a charge level threshold. The controller may derate an engine of the machine based on determining that the simulated battery charge level does not satisfy the charge level threshold.

20 Claims, 3 Drawing Sheets

BATTERY CONSUMPTION SIMULATION OF A MACHINE BASED ON FUEL BURN DATA OF THE MACHINE

TECHNICAL FIELD

The present disclosure relates generally to simulating battery consumption of a machine and, for example, to simulating battery consumption of the machine based on fuel burn data of the machine.

BACKGROUND

A machine, that typically operates based on an amount of fuel burned, may be evaluated for conversion to a battery electric vehicle or battery electric machine (BEM). Evaluating the machine for such a purpose may require the installation and configuration of multiple devices on the machine, the installation and configuration of multiple devices in a testing facility, or the installation and configuration of multiple software packages, among other examples. Accordingly, evaluating the machine for conversion to a BEM consumes network resources (e.g., to enable communication between the multiple devices on the machine and in the testing facility), storage resources (e.g., to store data generated by the machine and the multiple devices), computing resources (e.g., to process the data generated), among other examples.

Additionally, configuring the machine, the multiple devices, and the software packages to communicate with each other, to generate relevant data, and to properly process the data can be a substantially complex task. Accordingly, evaluating the machine for conversion to a BEM is a substantially complex task.

SUMMARY

In some implementations, a method performed by a device of a machine includes obtaining a battery consumption configuration of the machine based on information regarding the machine; obtaining fuel burn data indicating an amount of fuel burned by the machine; determining a simulated battery consumption of the machine based on the battery consumption configuration and the fuel burn data; determining a simulated battery charge level based on the simulated battery consumption; determining whether the simulated battery charge level satisfies a charge level threshold; and derating an engine of the machine based on determining that the simulated battery charge level does not satisfy the charge level threshold.

In some implementations, a machine controller of a machine includes one or more memories and one or more processors configured to: obtain a battery consumption configuration of the machine based on information regarding the machine; obtain fuel burn data indicating an amount of fuel burned by the machine, convert the fuel burn data to a simulated battery consumption of the machine based on the battery consumption configuration; determine a simulated battery charge level based on the simulated battery consumption; determine whether the simulated battery charge level enables the machine to continue to perform a current task; and prevent the machine from continuing to perform the current task based on determining that the simulated battery charge level does not enable the machine to continue to perform the current task.

In some implementations, a machine includes an implement; an engine; a first controller associated with the engine; and a second controller configured to: obtain a battery consumption configuration of the machine based on information regarding the machine; obtain, from the first controller, fuel burn data indicating an amount of fuel burned by the machine; determine a simulated battery charge level based on the battery consumption configuration and the fuel burn data; determine whether the simulated battery charge level satisfies a charge level threshold; and provide a command to reduce an output of the engine to prevent a movement of the implement based on determining that the simulated battery charge level does not satisfy the charge level threshold.

DETAILED DESCRIPTION

Implementations described herein are directed to simulating an operation of a battery electric machine (BEM), which is a battery electric vehicle. For example, a machine controller (of a machine) may control an operation of the machine to simulate the operation of the BEM. In some situations, the machine controller may use a simulation tool to simulate the operation of the BEM. The machine may be configured to operate based on fuel (e.g., diesel fuel) consumed, for example, by way of an internal combustion via an engine of the machine. Unlike the BEM, the machine may be configured to operate without using an electric motor and without using chemical energy stored in rechargeable battery packs.

When controlling the operation of the machine to simulate the operation of the BEM, the machine controller may obtain fuel burn data from an engine controller associated with the engine of the machine. The fuel burn data may indicate an amount of fuel burned by the machine while performing a current task (e.g., an amount of fuel consumed as part of a combustion process of the engine while the machine performs the current task). The machine controller may convert (e.g., using the simulation tool) the amount of fuel burned by the machine to a simulated battery consumption of the machine. "Simulated battery consumption" may refer to an amount of battery power (of a battery or a battery pack) that would have been consumed by the BEM while performing the current task.

The machine controller may determine (e.g., using the simulation tool) a simulated battery charge level based on the simulated battery consumption. "Simulated battery charge level" may refer to an amount of battery charge that would be remaining for the battery or the battery pack, for a BEM.

The machine controller may determine whether the simulated battery charge level satisfies a first charge level threshold. The first charge level threshold may be associated with a battery charge level that would render the BEM inoperable (e.g., that would prevent the BEM from operating an implement due to an insufficient amount of battery power).

Based on determining that the simulated battery charge level does not satisfy the first charge level threshold, the machine controller may prevent the machine from continuing to perform the current task. For example, the machine controller may provide a command, to the engine controller, to derate the engine.

The machine controller may provide an option to simulate a battery charging operation based on determining that the simulated battery charge level does not satisfy the first charge level threshold. Based on receiving a request to simulate the battery charge operation, the machine controller (e.g., using the simulation tool) may simulate the battery charging operation. In some examples, the machine controller may prevent the machine from continuing to perform the current task while simulating the battery charging operation. During the battery charging operation, the machine controller may determine whether the simulated battery charge level satisfies a second charge level threshold that exceeds the first charge level threshold.

The machine controller may enable the machine to resume performing the current task based on determining that the simulated battery charge level satisfies the second charge level threshold. The machine controller may further determine and provide information regarding a simulated battery discharging rate, a remaining amount of machine operating time based on the simulated battery discharging rate, a simulated battery charging rate, and a simulated amount of time until the simulated battery charge level satisfies the second charge level threshold.

The term "machine" may refer to a device that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

Figure 1:
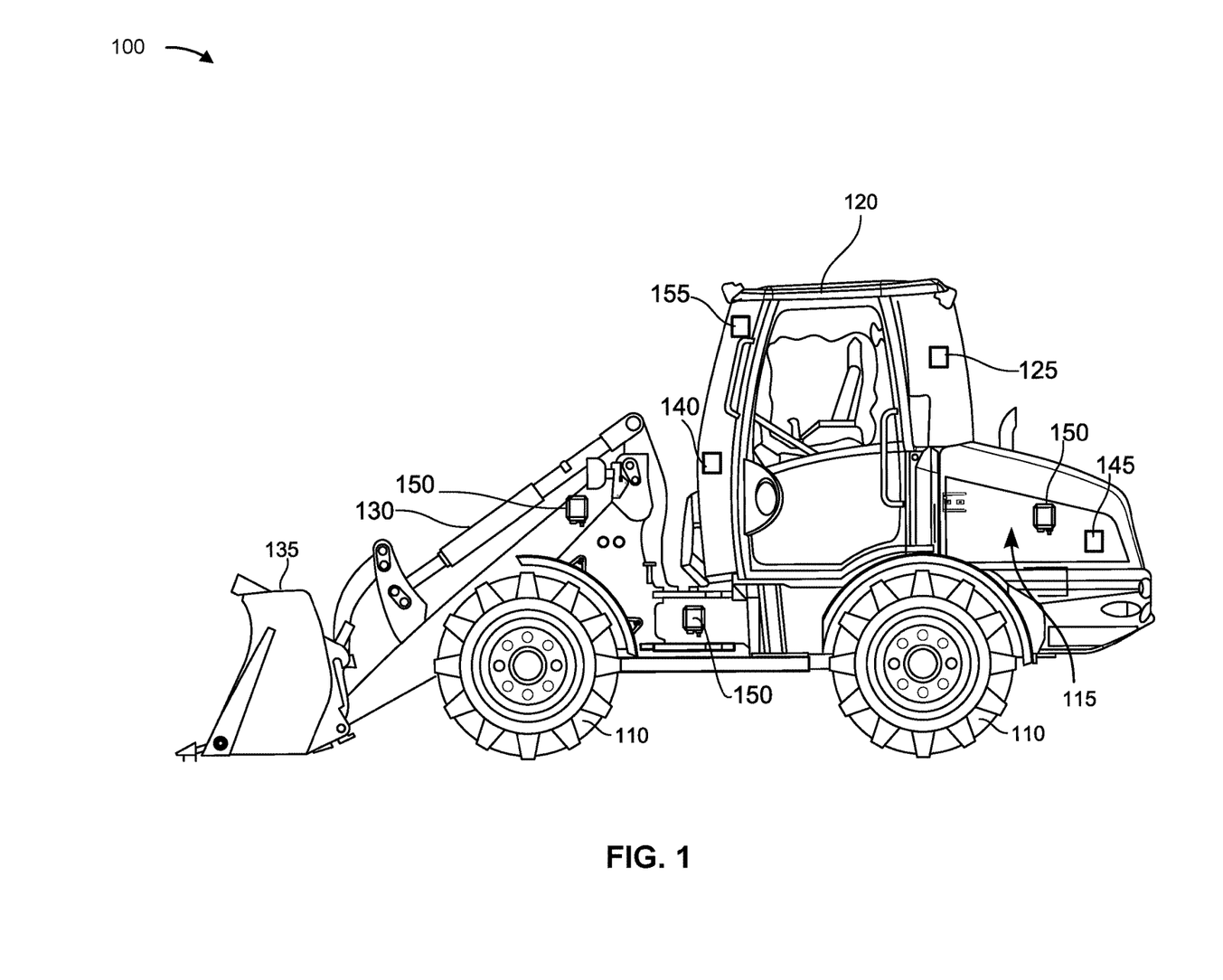
FIG. 1 is a diagram of an example machine described herein.

FIG. 1 is a diagram of an example machine 100 described herein. Machine 100 is embodied as an earth moving machine, such as a wheel loader. Alternatively, machine 100 may be another type of machine, such as an excavator, a dozer, among other examples.

As shown in FIG. 1, machine 100 includes ground engaging members 110, an engine 115, an operator cabin 120, a wireless communication component 125, a stick 130, and a machine work tool 135. Ground engaging members 110 may include wheels (as shown in FIG. 1), tracks, rollers, among other examples, for propelling machine 100. Ground engaging members 110 are mounted on a machine body and are driven by engine 115 and drive trains (not shown). Engine 115 may be operatively connected to provide power to drive at least one of the ground engaging members 110. Operator cabin 120 is supported by the machine body. Operator cabin 120 may include an integrated display (not shown) and operator controls (not shown), such as, for example, an integrated joystick. The operator controls may include one or more input components.

For an autonomous machine, the operator controls may not be designed for use by an operator and, rather, may be designed to operate independently from an operator. In this case, for example, the operator controls may include one or more input components that provide an input signal for use by another component without any operator input.

Wireless communication component 125 may include one or more devices that are capable of communicating with one or more other machines and/or one or more devices, as described herein. Wireless communication component 125 may include a transceiver, a separate transmitter and receiver, an antenna, among other examples. Wireless communication component 125 may communicate with the one or more machines using a short-range wireless communication protocol such as, for example, BLUETOOTH® Low-Energy, BLUETOOTH®, Wi-Fi, near-field communication (NFC), Z-Wave, ZigBee, or Institute of Electrical and Electronics Engineers (IEEE) 802.154, among other examples.

Additionally, or alternatively, wireless communication component 125 may communicate with one or more other machines and/or one or more devices via a network that includes one or more wired and/or wireless networks.

Stick 130 is pivotally mounted at its proximal end to the machine body and is articulated relative to the machine body by one or more fluid actuation cylinders (e.g., hydraulic or pneumatic cylinders), electric motors, and/or other electro-mechanical components. Stick 130 may be referred to as a linkage. Machine work tool 135 is mounted at a distal end of stick 130 and may be articulated relative to stick 130 by one or more fluid actuation cylinders, electric motors, and/or other electro-mechanical components. Machine work tool 135 may be a bucket (as shown in FIG. 1) or another type of tool or implement that may be mounted on stick 130. Machine work tool 135 may be referred to as an implement.

As shown in FIG. 1, machine 100 includes a machine controller 140, an engine controller 145 associated with engine 115, one or more inertial measurement units (IMUs) 150 (referred to herein individually as "IMU 150," and collectively referred to as "IMUs 150"), and a global positioning system (GPS) device 155. Machine controller 140 may control and/or monitor operations of machine 100. For example, machine controller 140 may control and/or monitor the operations of machine 100 based on signals from engine controller 145. In some examples, based on signals from engine controller 145, machine controller 140 may provide a command to engine controller 145 to cause engine controller 145 to derate engine 115, may provide information regarding a simulated battery consumption based on signals from engine controller 145, may provide information regarding a simulated battery discharging rate, among other examples, as described herein. In some situations, machine controller 140 may include an electronic control module.

Engine controller 145 may control and/or monitor operations of engine 115. For example, engine controller 145 may monitor an amount of fuel burned (e.g., an amount of fuel consumed) as part of a combustion process of engine 115 and may generate fuel burn data indicating the amount of fuel burned. The amount of fuel burned may be a total amount of fuel burned by engine 115. Additionally, or alternatively, the fuel burn data may indicate a fuel burn rate of engine 115. Engine controller 145 may control an operation of engine 115. For example, engine controller 145 may derate engine 115 based on a signal (e.g., a command) from machine controller 140. In some situations, engine controller 145 may include an electronic control module.

As shown in FIG. 1, IMUs 150 are installed at different positions on components or portions of machine 100, such as, for example, stick 130, the machine body, engine 115, among other examples. An IMU 150 includes one or more devices that are capable of receiving, generating, storing, processing, and/or providing signals indicating a position and orientation of a component, of machine 100, on which IMU 150 is installed. For example, IMU 150 may include one or more accelerometers and/or one or more gyroscopes.

The one or more accelerometers and/or the one or more gyroscopes generate and provide signals that can be used to determine a position and orientation of the IMU 150 relative to a frame of reference and, accordingly, a position and orientation of the component. While the example discussed herein refers to IMUs 150, the present disclosure is applicable to using one or more other types of sensor devices that may be used to determine a position and orientation of a component of machine 100.

GPS device 155 may include one or more devices that are capable of receiving, generating, storing, processing, and/or providing signals that may be used to determine a location of machine 100, a velocity of machine 100, a movement of machine 100, among other examples. As an example, GPS device 155 may generate location data that may be used by machine controller 140 to determine whether machine 100 is located within a distance threshold of a charging station (to simulate a battery charging operation). Engine controller 145, IMUs 150 and/or GPS device 155 may provide signals periodically (e.g., every twenty milliseconds, every fifty milliseconds, among other examples). Additionally, or alternatively, engine controller 145, IMU 150 and/or GPS device 155 may provide signals based on a trigger (e.g., based on receiving a request from machine controller 140).

As indicated above, FIG. 1 is provided as an example. Other examples may differ from what was described in connection with FIG. 1.

Figure 2:
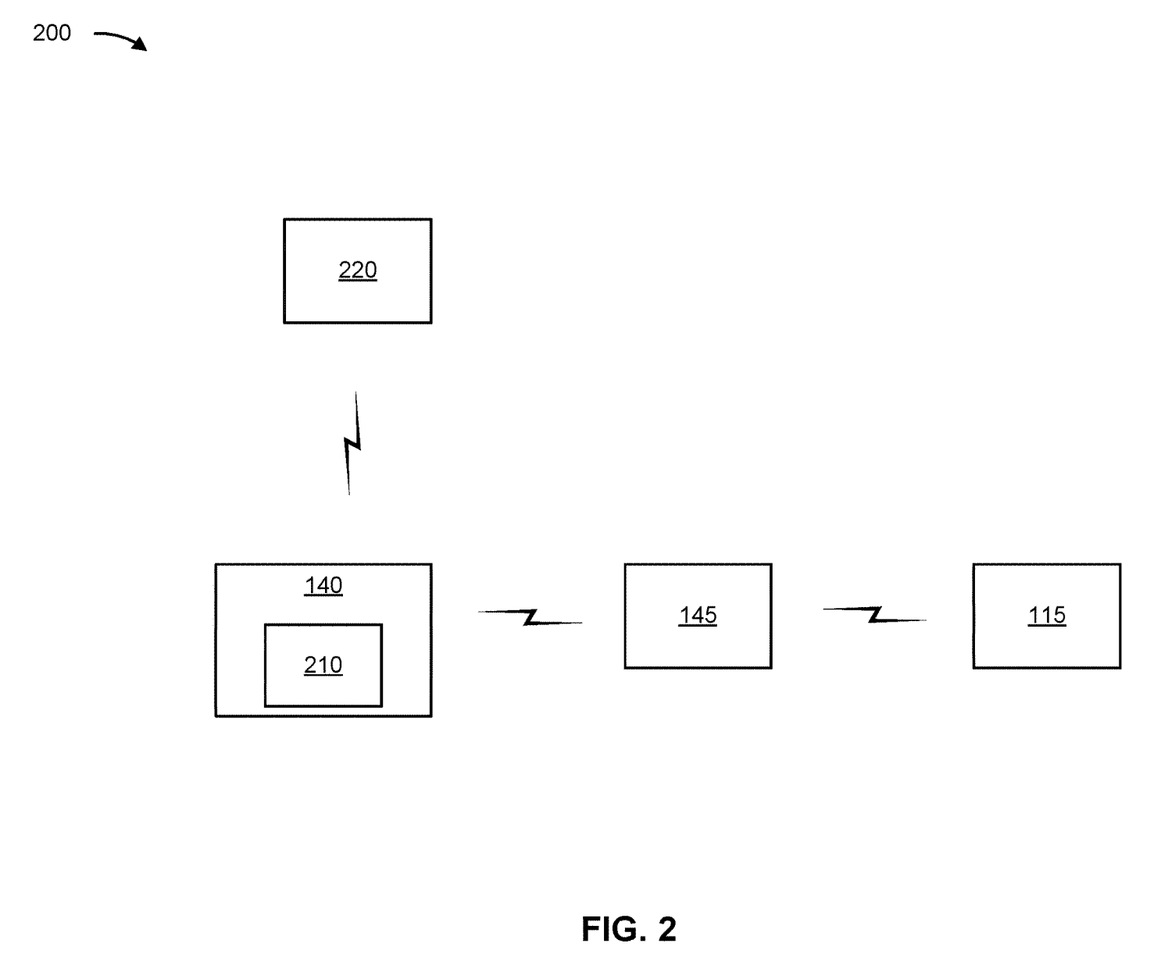
FIG. 2 is a diagram of an example system described herein.

FIG. 2 is a diagram of an example system 200 described herein. As shown in FIG. 2, system 200 includes engine 115, machine controller 140, engine controller 145, and a device 220 associated with machine 100. Some of the elements of FIG. 2 have been described above in connection with FIG. 1. Engine 115 may be configured to burn fuel (e.g., consume fuel, such as diesel fuel) to provide power to operate components of machine 100 (e.g., ground engaging members 110, stick 130, machine work tool 135, among other examples).

Machine controller 140 may include one or more processors and one or more memories. A processor may be implemented in hardware, firmware, and/or a combination of hardware and software. A processor may be capable of being programmed to perform a function. A memory may store information and/or instructions for use by a processor to perform the function. For example, when performing the function, machine controller 140 may control an operation of machine 100 to simulate an operation of a BEM, as described herein.

Engine controller 145 may include one or more processors and one or more memories similar to the one or more processors and one or more memories included in machine controller 140. A memory may store information and/or instructions for use by a processor to perform a function. For example, when performing the function, engine controller 145 may monitor an operation of engine 115 and generate fuel burn data based on monitoring the operation of engine 115. Additionally, engine controller 145 may provide a command to derate engine 115, as explained herein.

As shown in FIG. 2, machine controller 140 may execute a simulation tool 210. Simulation tool 210 may include simulation software that enables machine controller 140 to control an operation of machine 100 to simulate an operation of a BEM. In some implementations, simulation tool 210 may include a model (e.g., a mathematical model) that is configured to convert fuel burned into battery consumption, configured to determine a simulated battery discharging rate, configured to determine a simulated battery charging rate, among other examples, as described herein.

In some examples, device 220 may include a display included in operator cabin 120. Additionally, or alternatively, device 220 may include a user device of an operator of machine 100, a user device of a site manager associated with machine 100, and/or a user device of an owner of machine 100. Additionally, or alternatively, device 220 may include a back office system (e.g., that monitors an operation of machine 100).

In some implementations, when controlling an operation of machine 100 to simulate an operation of a BEM, machine controller 140 may receive a request to initiate a simulation of the operation of the BEM and, based on the request, may initiate simulation tool 210. Machine controller 140 may determine (e.g., using simulation tool 210) a battery consumption configuration of the machine based on information regarding the machine. For example, machine controller 140 may obtain battery consumption information regarding the battery consumption configuration, from a memory associated with machine controller 140, based on information regarding machine. As an example, the battery consumption information may be stored in a data structure in association with the information regarding machine 100.

The battery consumption configuration may be used to convert the amount of fuel burned by machine 100 to the simulated battery consumption. As an example, the battery consumption configuration may convert a volume of diesel fuel pumped into engine 115 into an amount of battery power (e.g., kilowatts or some other power measuring unit) that would have been consumed by the BEM (while performing a current task performed by machine 100). In some situations, the battery consumption configuration may include a model, such as a mathematical model. For instance, the battery consumption configuration may include one or more mathematical operations that are used to convert the amount of fuel burned by machine 100 to the simulated battery consumption.

The battery consumption configuration may be based on the information regarding machine 100. In some situations, the information regarding machine 100 include information regarding physical properties and/or efficiency estimates associated with machine 100. For example, the information regarding machine 100 may include machine type information identifying a machine type of machine 100. For instance, a conversion of fuel burned to the simulated battery consumption for a first machine type (e.g., a large wheel loader) may be different than a conversion of fuel burned to the simulated battery consumption for a second machine type (e.g., a medium wheel loader).

Additionally, or alternatively, the information regarding machine 100 may include engine size information identifying a size of engine 115. For instance, the conversion of fuel burned to the simulated battery consumption for an engine of a first size may be different than a conversion of fuel burned to the simulated battery consumption for an engine of a second size.

Additionally, or alternatively, the information regarding machine 100 may include machine utilization information identifying a task performed by machine 100. For instance, the conversion of fuel burned to the simulated battery consumption for a first task (e.g., picking up material) may be different than a conversion of fuel burned to the simulated battery consumption for a second task (e.g., moving material from one location to another location).

In some situations, the conversion of fuel burned to the simulated battery consumption may depend on a capacity of a simulated battery (or a simulated battery pack) assigned to/associated with machine 100. For instance, the conversion of fuel burned to the simulated battery consumption for a first capacity may be different than a conversion of fuel burned to the simulated battery consumption for a second capacity.

In order to determine the simulated battery consumption, machine controller 140 may obtain the fuel burn data associated with the current task performed by machine 100. Machine controller 140 may obtain the fuel burn data from engine controller 145, in a manner similar to the manner described herein. In some situations, machine controller 140 and engine controller 145 may be connected via a controller area network (CAN) data link. In this regard, machine controller 140 may provide a request to engine controller 145 for the fuel burn data via the CAN data link and may receive the fuel burn data from engine controller 145 via the CAN data link.

Machine controller 140 determine the simulated battery consumption based on the battery consumption configuration and the fuel burn data. For example, machine controller 140 may provide the fuel burn data (e.g., the amount of fuel burned by machine 100) as an input to the battery consumption configuration (e.g., as input to the model) and the battery consumption configuration (e.g., the model) may provide the simulated battery consumption as an output.

Machine controller 140 may determine the simulated battery charge level (e.g., an amount of battery charge remaining for the simulated battery or the simulated battery pack). In some examples, the simulated battery charge level may be a percentage of a total charge capacity of the simulated battery or the simulated battery pack. Machine controller 140 may determine the simulated battery charge level based on the simulated battery consumption. For example, machine controller 140 may subtract the simulated battery consumption from a previous simulated battery charge level of the simulated battery or the simulated battery pack (the previous simulated battery charge level being determined prior to determining the simulated battery consumption).

Machine controller 140 may determine whether the simulated battery charge level satisfies the first charge level threshold described above. In some implementations, machine 100 and/or simulation tool 210 may be configured with information identifying the first charge level threshold. Additionally, or alternatively, machine 100 may receive the information identifying the first charge level threshold from the user device of the operator, the user device of the site manager, and/or the user device of the owner of machine 100. Additionally, or alternatively, machine 100 may receive the information identifying the first charge level threshold from the back office system.

Based on determining that the simulated battery charge level satisfies the first charge level threshold, machine controller 140 may enable machine 100 to continue to perform the current task. In some examples, machine controller 140 may determine a simulated battery discharging rate based on the battery consumption configuration and the fuel burn data. For example, machine controller 140 may determine a fuel burn rate based on the fuel burn data. Machine controller 140 may use the battery consumption configuration to convert the fuel burn rate to the simulated battery discharging rate, in a manner similar to the manner described in connection with determining the simulated battery consumption.

Based on the simulated battery discharging rate, machine controller 140 may determine a remaining amount of machine operating time. As an example, the machine operating time may indicate an amount of time during which machine 100 is able to perform the current task given the simulated battery charge level (e.g., a remaining machine run time based on the simulated battery charge level). In other words, the machine operating time may indicate an amount of time during which the machine can perform an operation based on the battery charge level.

In some implementations, machine controller 140 may provide discharge information to device 220. For example, machine controller 140 may provide information identifying the simulated battery charge level, information identifying the simulated battery discharging rate, information identifying the remaining amount of machine operating time, and/or information indicating that a simulation of a battery charging operation has not been initiated. In some implementations, machine controller 140 may cause wireless communication component 125 to provide the discharge information to device 220.

Based on determining that the simulated battery charge level does not satisfy the first charge level threshold, machine controller 140 may determine that the simulated battery charge level does not enable machine 100 to continue to perform the current task. Accordingly, machine controller 140 may prevent machine 100 from continuing to perform the current task.

In some implementations, machine controller 140 provide a command to engine controller 145 to derate engine 115. For example, machine controller 140 may provide a first command to limit an engine speed of engine 115 and/or provide a second command to limit an amount of torque of engine 115. In some implementations, as a result of derating engine 115, engine 115 may produce a sufficient amount of power to enable machine 100 to travel to a nearest charging station. However, the amount of power may be insufficient to operate other components of machine 100, such as stick 130, machine work tool 135, among other examples.

Based on determining that the simulated battery charge level does not satisfy the first charge level threshold, machine controller 140 may provide a charging option to simulate the battery charging operation. Machine controller 140 may provide the charging option to device 220 in a manner similar to the manner described above. Based on providing the charging option to simulate the battery charging operation, machine controller 140 may receive a request to simulate the battery charging operation. In some examples, machine controller 140 may determine a location of the machine prior to simulating the battery charging operation. For example, machine controller 140 may obtain the location data from GPS device 155 and determine the location of machine 100 based on the location data. Machine controller 140 may determine whether machine 100 is located within a distance threshold of a charging station.

In some situations, based on determining that machine 100 is not located within the distance threshold of the charging station, machine controller 140 may prevent the battery charging operation from being initiated. In this regard, machine controller 140 may provide to device 220 a notification indicating that machine 100 is to move within the distance threshold of the charging station prior to the battery charging operation being initiated. The notification may include information identifying a location of the charging station. By preventing the battery charging operation from being initiated in this manner, machine controller 140 may provide an appropriate simulation of the operation of the BEM.

Based on determining that machine 100 is located within the distance threshold of the charging station, machine controller 140 may simulate the battery charging operation. In some situations, machine controller 140 may prevent machine 100 from continuing to perform the current task while simulating the battery charging operation. As an example, machine controller 140 may provide a command to engine controller 145 to continue derating engine 115 while simulating the battery charging operation.

Machine controller 140 may determine a battery charging configuration of machine 100 (e.g., a charging capacity setting of machine 100). For example, machine controller 140 may determine a charging capacity of a simulated battery charger associated with machine 100. In some situations, the charging capacity may be based on a battery size of the simulated battery or the simulated battery pack, a charger size of the simulated battery charger, a type of power provided by the simulated battery charger (e.g., alternating current (AC) power or direct current (DC) power), and/or a power capacity associated with the simulated battery charger, among other examples. Additionally, or alternatively, machine controller 140 may determine a total charge capacity of the simulated battery or the simulated battery pack. In some situations, the total charge capacity (energy storage) may be based on the size of engine 115, a size of machine 100, a work cycle associated with machine 100, among other examples. In some situations, machine controller 140 may determine a charging capacity of the charging station.

Based on the battery charging configuration and/or the charging capacity of the charging station, machine controller 140 may determine a simulated battery charging rate of machine 100. In some situations, a charge cycle and the simulated battery charging rate (e.g., an energy deposit rate) may be based on a battery state of charge of the simulated battery or the simulated battery pack. With respect to the battery state of charge for example, energy can be stored (in the simulated battery or the simulated battery pack) at a rate when going from 20% battery charge to 60% battery charge that is faster than a rate when going from 50% battery charge to 90% battery charge. The simulated battery charging rate (e.g., the rate at which energy be deposited) may decrease as the battery charge satisfies a battery charge threshold (e.g., as the simulated battery or the simulated battery pack reaches higher battery state of charge). The decrease in the simulated battery charging rate may also be a function of the ability of the simulated battery or the simulated battery pack to receive energy and/or the ability of the simulated battery charger to deliver power.

In some situations, the simulated battery charging rate may be based on ambient conditions (or environmental conditions), such as ambient temperature. In some situations, the simulated battery charging rate may be based on set up time and/or connection time of the simulated battery charger and/or of machine 100 (e.g., based on various connection time assumptions that are based on site set-up). In some instances, the simulation tool may enable intelligent charging to simulate energy usage at times of lower energy cost (grid optimized) or managed charge state (battery life optimization). Machine controller 140 may determine a simulated amount of time until the simulated battery charge level satisfies the second charge level threshold described above. In some examples, machine controller 140 may determine the simulated amount of time based on the simulated battery charging rate, the simulated battery charge level, and the total charge capacity of the simulated battery or the simulated battery pack.

In some implementations, machine controller 140 may provide charging information to device 220 in a manner similar to the manner in which the discharge information is provided to device 220. For example, machine controller 140 may provide information identifying the simulated battery charge level, information identifying the simulated battery charging rate, information identifying the simulated amount of time until the simulated battery charge level satisfies the second charge level threshold, and/or information indicating that a simulation of the battery charging operation has been initiated.

After initiating the simulation of the battery charging operation, machine controller 140 may redetermine the simulated battery charge and determine whether the simulated battery charge level satisfies the second charge level threshold. Based on determining that the simulated battery charge level satisfies the second charge level threshold, machine controller 140 may enable machine 100 to resume the current task. As an example, machine controller 140 may provide a command to engine controller 145 to terminate derating engine 115.

In some examples, machine controller 140 may provide to device 220 a discharge option to terminate the battery charging operation. Machine controller 140 may receive a request to terminate the battery charging operation via the discharge option. Based on receiving the request, machine controller 140 may determine whether the simulated battery charge level satisfies the second charge level threshold and may enable machine 100 to resume the current task based on determining that the simulated battery charge level satisfies the second charge level threshold.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example component may perform one or more functions described as being performed by another set of devices of the example component.

Figure 3:
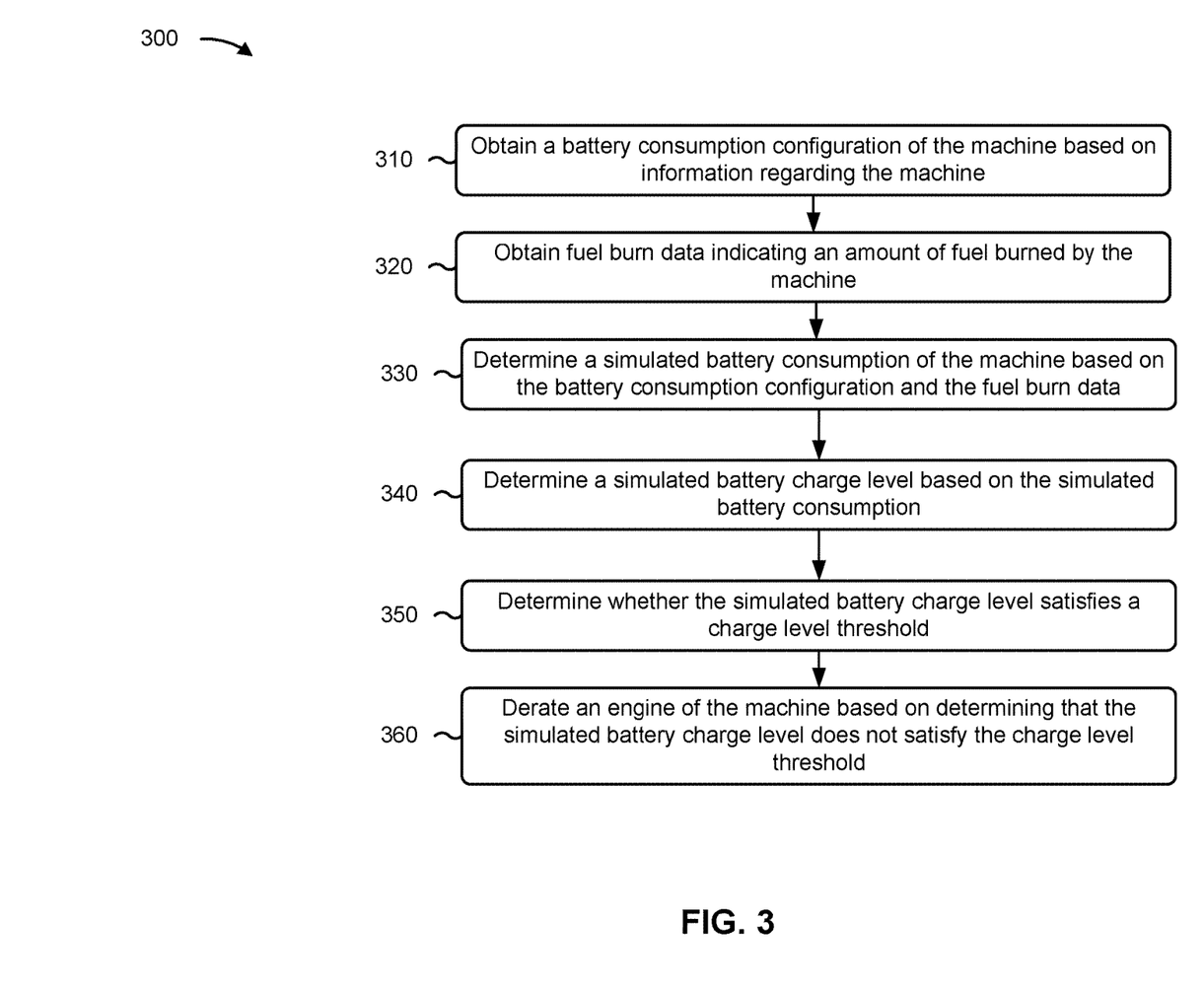
FIG. 3 is a flowchart of an example process associated with battery consumption simulation of a machine based on fuel burn data of the machine.

FIG. 3 is a flowchart of an example process 300 associated with battery consumption simulation of a machine based on fuel burn data of the machine. In some implementations, one or more process blocks of FIG. 3 may be performed by a machine controller (e.g., machine controller 140). In some implementations, one or more process blocks of FIG. 3 may be performed by another device or a group of devices separate from or including the machine controller, such as engine controller 145 (e.g., engine controller 145), and/or a device associated with machine 100 (e.g., device 220).

As shown in FIG. 3, process 300 may include obtaining a battery consumption configuration of the machine based on information regarding the machine (block 310). For example, the controller may obtain a battery consumption configuration of the machine based on information regarding the machine, as described above.

In some implementations, obtaining the battery consumption configuration comprises obtaining engine size information identifying a size of the engine, wherein the information regarding the machine includes the engine size information, and determining the battery consumption configuration based on the engine size information.

In some implementations, obtaining the battery consumption configuration comprises obtaining machine utilization information identifying a task performed by the machine, wherein the information regarding the machine includes the machine utilization information, and determining the battery consumption configuration based on the machine utilization information.

In some implementations, obtaining the battery consumption configuration comprises obtaining machine type information identifying a machine type of the machine, wherein the information regarding the machine includes the machine type information, and determining the battery consumption configuration based on the machine type information.

As further shown in FIG. 3, process 300 may include obtaining fuel burn data indicating an amount of fuel burned by the machine (block 320). For example, the controller may obtain fuel burn data indicating an amount of fuel burned by the machine, as described above.

As further shown in FIG. 3, process 300 may include determining a simulated battery consumption of the machine based on the battery consumption configuration and the fuel burn data (block 330). For example, the controller may determine a simulated battery consumption of the machine based on the battery consumption configuration and the fuel burn data, as described above.

As further shown in FIG. 3, process 300 may include determining a simulated battery charge level based on the simulated battery consumption (block 340). For example, the controller may determine a simulated battery charge level based on the simulated battery consumption, as described above.

As further shown in FIG. 3, process 300 may include determining whether the simulated battery charge level satisfies a charge level threshold (block 350). For example, the controller may determine whether the simulated battery charge level satisfies a charge level threshold, as described above.

As further shown in FIG. 3, process 300 may include derating an engine of the machine based on determining that the simulated battery charge level does not satisfy the charge level threshold (block 360). For example, the controller may derate an engine of the machine based on determining that the simulated battery charge level does not satisfy the charge level threshold, as described above.

In some implementations, process 300 includes providing a notification to one or more devices associated with the machine, wherein the notification includes information identifying the simulated battery charge level.

In some implementations, process 300 includes determining a simulated battery discharging rate based on the battery consumption configuration and the fuel burn data, and determining a remaining amount of machine operating time based on the simulated battery discharging rate, wherein the machine operating time indicates an amount of time during which the machine is able to perform a task, and wherein providing the notification includes providing information identifying the remaining amount of machine operating time.

In some implementations, process 300 includes receiving a request to simulate a battery charging operation, simulating the battery charging operation, based on the request, to increase the simulated battery charge level, and continuing derating the engine until the simulated battery charge level satisfies the charge level threshold. Process 300 may include maintaining an output of the engine to continue to prevent the movement of the implement until the simulated battery charge level satisfies the charge level threshold Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

Implementations described herein are directed to simulating an operation of a BEM. For example, a machine controller may control an operation of a machine to simulate the operation of the BEM. In some situations, the machine controller may use a simulation tool to simulate the operation of the BEM based on an amount of fuel consumed by the machine.

Simulating the operation of the BEM may be useful for multiple reasons. For example, simulating the operation of the BEM may be useful for designing and manufacturing a BEM that will perform the tasks of the machine. Additionally, or alternatively, simulating the operation of the BEM may be useful for site planning and management at job sites similar to a job site at which the machine has performed the tasks when simulating the BEM.

In some instances, evaluating the machine for conversion to the BEM may require the installation and configuration of multiple devices on the machine, the installation and configuration of multiple devices in a testing facility, the installation and configuration of multiple software packages, among other examples. Accordingly, evaluating the machine for conversion to the BEM consumes network resources (to enable communication between the multiple devices on the machine and in the testing facility), storage resources (to store data generated by the machine and the multiple devices), computing resources (to process the data generated), among other examples.

By simulating the operation of a BEM as described herein, implementations described herein may preserve network resources, storage resources, and computing resources that would have otherwise been consumed by the installation and configuration of multiple devices and software packages to evaluate the machine for conversion to the BEM.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by a device of a machine, the method comprising:
    obtaining a battery consumption configuration of the machine based on information regarding the machine;
    obtaining fuel burn data indicating an amount of fuel burned by the machine while performing a task;

determining, based on the battery consumption configuration and the fuel burn data, a simulated battery consumption that indicates an amount of battery power that would be consumed by the machine while performing the task;
determining a simulated battery charge level based on the simulated battery consumption;
determining that the simulated battery charge level does not satisfy a charge level threshold; and
derating an engine of the machine based on determining that the simulated battery charge level does not satisfy the charge level threshold.

2. The method of claim 1, wherein obtaining the battery consumption configuration comprises:
obtaining machine type information identifying a machine type of the machine,
wherein the information regarding the machine includes the machine type information; and
determining the battery consumption configuration based on the machine type information.

3. The method of claim 1, wherein obtaining the battery consumption configuration comprises:
obtaining engine size information identifying a size of the engine,
wherein the information regarding the machine includes the engine size information; and
determining the battery consumption configuration based on the engine size information.

4. The method of claim 1, wherein obtaining the battery consumption configuration comprises:
obtaining machine utilization information identifying the task,
wherein the information regarding the machine includes the machine utilization information; and
determining the battery consumption configuration based on the machine utilization information.

5. The method of claim 1, further comprising:
providing a notification to one or more devices associated with the machine,
wherein the notification includes information identifying the simulated battery charge level.

6. The method of claim 5, further comprising:
determining a simulated battery discharging rate based on the battery consumption configuration and the fuel burn data; and
determining a remaining amount of machine operating time based on the simulated battery discharging rate,
wherein the machine operating time indicates an amount of time during which the machine is able to perform the task, and
wherein providing the notification includes providing information identifying the remaining amount of machine operating time.

7. The method of claim 1, further comprising:
continuing derating the engine until the simulated battery charge level satisfies the charge level threshold.

8. A machine controller of a machine, the machine controller comprising:
one or more memories; and
one or more processors configured to:
obtain a battery consumption configuration of the machine based on information regarding the machine;
obtain fuel burn data indicating an amount of fuel burned by the machine while performing a task;
convert the fuel burn data to a simulated battery consumption of the machine based on the battery consumption configuration, wherein the simulated battery consumption indicates an amount of battery power that would be consumed by the machine while performing the task;
determine a simulated battery charge level based on the simulated battery consumption;
determine whether the simulated battery charge level enables the machine to continue to perform a current task; and
prevent the machine from continuing to perform the current task based on whether the simulated battery charge level enables the machine to continue to perform the current task.

9. The machine controller of claim 8, wherein the one or more processors are configured to:
receive a request to simulate a battery charging operation;
simulate the battery charging operation based on receiving the request; and
prevent the machine from continuing to perform the current task while simulating the battery charging operation.

10. The machine controller of claim 9, wherein the one or more processors are configured to:
determine a battery charging configuration of the machine;
determine a simulated battery charging rate of the machine based on the battery charging configuration;
determine a simulated amount of time until the simulated battery charge level satisfies a charge level threshold; and
provide information indicating the simulated amount of time to one or more devices associated with the machine.

11. The machine controller of claim 9, wherein, to simulate the battery charging operation, the one or more processors are configured to:
determine a location of the machine; and
simulate the battery charging operation based on receiving the request and based on the location of the machine.

12. The machine controller of claim 8, wherein the one or more processors are configured to:
determine a simulated battery discharging rate of the machine based on the battery consumption configuration and the fuel burn data; and
provide information indicating the simulated battery discharging rate to one or more devices associated with the machine.

13. The machine controller of claim 8,
wherein, to obtain the fuel burn data, the one or more processors are configured to:
obtain the fuel burn data from an engine controller of an engine of the machine, and
wherein, to prevent the machine from continuing to perform the current task, the one or more processors are configured to at least one of:
provide, to the engine controller, a command to limit an engine speed of the engine; or
provide, to the engine controller, a command to limit an amount of torque of the engine.

14. The machine controller of claim 8, wherein, to obtain the battery consumption configuration, the one or more processors are configured to:
obtain one or more of:
engine size information identifying a size of an engine of the machine, or machine utilization information identifying the current task; and determine the battery consumption configuration based on the one or more of the engine size information or the machine utilization information.

15. A machine, comprising:

an engine;

a first controller associated with the engine; and a second controller configured to:
- obtain a battery consumption configuration of the machine based on information regarding the machine;
- obtain, from the first controller, fuel burn data indicating an amount of fuel burned by the machine while performing a task;
- determine, based on the battery consumption configuration and the fuel burn data, a simulated battery consumption that indicates an amount of battery power that would be consumed by the machine while performing the task;
- determine that a simulated battery charge level, based on the simulated battery consumption, does not satisfy a charge level threshold; and
- provide a command to reduce an output of the engine to prevent a movement of an implement based on determining that the simulated battery charge level does not satisfy the charge level threshold.

16. The machine of claim 15, wherein, to obtain the battery consumption configuration, the second controller is further configured to:
- obtain one or more of:
  - machine type information identifying a machine type of the machine,
  - engine size information identifying a size of the engine, or
  - machine utilization information identifying the task; and
- determine the battery consumption configuration based on the one or more of the machine type information, the engine size information, or the machine utilization information.

17. The machine of claim 15, wherein, to provide the command, the second controller is further configured to at least one of:
- provide, to the first controller, a command to limit an engine speed of the engine; or
- provide, to the first controller, a command to limit an amount of torque of the engine.

18. The machine of claim 15, wherein the second controller is further configured to:
- receive a request to simulate a battery charging operation;
- simulate the battery charging operation, based on the request, to increase the simulated battery charge level; and
- maintain a reduced output of the engine to continue to prevent the movement of the implement until the simulated battery charge level satisfies the charge level threshold.

19. The machine of claim 15, wherein the second controller is further configured to:
- determine a remaining amount of machine operating time based on a simulated battery discharging rate; and
- provide a notification that includes:
  - information identifying the simulated battery charge level, and
  - information identifying the remaining amount of machine operating time.

20. The machine of claim 15, wherein the charge level threshold is a first charge level threshold, and wherein the second controller is further configured to:
- determine a battery charging configuration of the machine;
- determine a simulated battery charging rate of the machine based on the battery charging configuration;
- determine a simulated amount of time until the simulated battery charge level satisfies a second charge level threshold that exceeds the first charge level threshold; and
- provide information indicating the simulated amount of time to one or more devices associated with the machine.

* * * * *